(12) United States Patent
Yokoyama et al.

(10) Patent No.: US 11,828,609 B2
(45) Date of Patent: Nov. 28, 2023

(54) CONTROL DEVICE OF VEHICLE AND VEHICLE CONTROL SYSTEM

(71) Applicant: TOYOTA JIDOSHA KABUSHIKI KAISHA, Toyota (JP)

(72) Inventors: Daiki Yokoyama, Gotemba (JP);
Yoshihiro Sakayanagi, Mishima (JP);
Midori Sugiyama, Susono (JP);
Tomohiro Kaneko, Mishima (JP);
Hirotaka Saito, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/864,782

(22) Filed: Jul. 14, 2022

(65) Prior Publication Data
US 2023/0028631 A1 Jan. 26, 2023

(30) Foreign Application Priority Data
Jul. 21, 2021 (JP) .................. 2021-120359

(51) Int. Cl.
*G01C 21/34* (2006.01)
*B60W 60/00* (2020.01)
*B60L 53/12* (2019.01)

(52) U.S. Cl.
CPC .......... *G01C 21/3484* (2013.01); *B60L 53/12* (2019.02); *B60W 60/001* (2020.02); *G01C 21/3476* (2013.01)

(58) Field of Classification Search
CPC . G01C 21/3484; G01C 21/3476; B60L 53/12; B60W 60/001
USPC ........................................... 701/408
See application file for complete search history.

(56) References Cited

U.S. PATENT DOCUMENTS

| 10,243,415 B1* | 3/2019 | Grundmann | ............ H02J 50/80 |
| 2010/0036599 A1* | 2/2010 | Froeberg | ............ G01C 21/3461 701/532 |

FOREIGN PATENT DOCUMENTS

JP   2003-275251   9/2003

\* cited by examiner

*Primary Examiner* — Isaac G Smith
(74) *Attorney, Agent, or Firm* — Finnegan, Henderson, Farabow, Garrett & Dunner, LLP.

(57) ABSTRACT

A vehicle information DB holds information on whether or not a vehicle falls under a welfare vehicle provided with an assistance apparatus for a driver who has a lower limb impairment. A power feed facility DB holds position information of a power feed facility and information indicating whether the power feed facility falls under a contact type power feed facility or a wireless power feed facility. A processing apparatus creates a travel route such that a larger number of wireless power feed facilities are included along the travel route when the vehicle falls under the welfare vehicle than when the vehicle does not fall under the welfare vehicle.

9 Claims, 8 Drawing Sheets

CONTROL DEVICE OF VEHICLE AND VEHICLE CONTROL SYSTEM

This nonprovisional application is based on Japanese Patent Application No. 2021-120359 filed with the Japan Patent Office on Jul. 21, 2021, the entire contents of which are hereby incorporated by reference.

BACKGROUND

Field

The present disclosure relates to a control device of a vehicle and a vehicle control system.

Description of the Background Art

A vehicle which a driver with a lower limb impairment can drive has been known. Such a vehicle may be referred to as a "welfare vehicle" or a "wellcab (trademark)." For example, Japanese Patent Laying-Open No. 2003-275251 discloses a welfare vehicle in which a user of a wheelchair can easily get in a driver's seat while the user sits on the wheelchair.

The welfare vehicle as above is variously devised to allow the user of the wheelchair to get in and out of the driver's seat. Even though the vehicle is variously devised, however, in getting in and out of the vehicle, such a user does so spending more time and troubles than people without physical impairment.

In recent years, electrically powered vehicles that travel with electric power received from a power feed facility outside the vehicle have increasingly been used as environmentally friendly vehicles. Power feed facilities are broadly categorized into a contact type power feed facility using a power feed cable and a wireless power feed facility capable of wirelessly feeding power without using the power feed cable. For the contact type power feed facility, works outside the vehicle for connecting the power feed cable to an inlet of the vehicle are required, which leads to much time and troubles for the user of the welfare vehicle as above.

SUMMARY

Therefore, an object of the present disclosure is to provide a control device of a vehicle and a vehicle control system that can reduce opportunities of power feed works outside a vehicle by a driver of a welfare vehicle.

A control device of a vehicle in the present disclosure is a control device of a vehicle incorporating a power reception apparatus that wirelessly receives electric power from a power feed facility outside the vehicle. The control device includes a storage device in which information on the vehicle and information on the power feed facility are stored and a processing apparatus that creates a travel route from a current location to a destination of the vehicle. The information on the vehicle includes information on whether the vehicle falls under a welfare vehicle provided with an assistance apparatus for a driver with a lower limb impairment. The information on the power feed facility includes position information of the power feed facility and information indicating whether the power feed facility falls under a contact type power feed facility or a wireless power feed facility. The processing apparatus creates the travel route such that a larger number of wireless power feed facilities are included along the travel route when the vehicle falls under the welfare vehicle than when the vehicle does not fall under the welfare vehicle.

With this control device, when the vehicle falls under the welfare vehicle, a travel route is created such that a large number of wireless power feed facilities are included along the travel route. Since the wireless power feed facility does not require works outside the vehicle for connecting the power feed cable to the inlet of the vehicle, the user does not necessarily have to get off the vehicle in power feed. Therefore, this control device can reduce opportunities of power feed works outside the vehicle by the driver of the welfare vehicle.

When the vehicle does not fall under the welfare vehicle, the processing apparatus may create the travel route shortest in travel distance or required time period to the destination.

When the travel route is created to include a large number of wireless power feed facilities along the travel route, the travel distance or the required time period to the destination may become long. According to the configuration, when the vehicle does not fall under the welfare vehicle, an unduly long travel distance or required time period to the destination can be avoided.

The processing apparatus may output route information for showing the created travel route on a display.

According to such a configuration, the driver of the welfare vehicle can check the travel route shown on the display and can then determine the travel route and a plan for power feed from the power feed facility. The display may be mounted on the vehicle or may be implemented by a portable terminal (a smartphone or the like) of the driver.

The processing apparatus may output route information for allowing the vehicle configured to autonomously travel to autonomously travel along the created travel route to the destination.

According to such a configuration, when the vehicle is autonomous and falls under the welfare vehicle, possibility that the driver gets off the vehicle for power feed can be suppressed and the vehicle can autonomously travel to the destination along the created travel route.

When the vehicle falls under the welfare vehicle, the processing apparatus may create a plan for power feed to the welfare vehicle along the travel route such that an amount of power feed from the wireless power feed facility is larger than the amount of power feed to a vehicle that does not fall under the welfare vehicle.

According to such a configuration, opportunities of power feed from the power feed facility to the welfare vehicle can be reduced. Therefore, opportunities of power feed works outside the vehicle by the driver of the welfare vehicle can further be reduced.

A vehicle control system in the present disclosure includes a vehicle incorporating a power reception apparatus that wirelessly receives electric power from a power feed facility outside the vehicle, a storage device in which information on the vehicle and information on the power feed facility are stored, and a processing apparatus that creates a travel route from a current location to a destination of the vehicle. The information on the vehicle includes information on whether the vehicle falls under a welfare vehicle provided with an assistance apparatus for a driver with a lower limb impairment. The information on the power feed facility includes position information of the power feed facility and information indicating whether the power feed facility falls under a contact type power feed facility or a wireless power feed facility. The processing apparatus creates the travel route such that a larger number of wireless power feed facilities are included along the travel route when the vehicle falls under the welfare vehicle than when the vehicle does not fall under the welfare vehicle.

In this control system, when the vehicle falls under the welfare vehicle, a travel route is created such that a large number of wireless power feed facilities are included along the travel route. Therefore, opportunities of power feed works outside the vehicle by the driver of the welfare vehicle can be reduced.

The vehicle may include a display on which the travel route created by the processing apparatus is shown.

According to such a configuration, the driver of the welfare vehicle can check the travel route on the display and can then determine the travel route and a plan for power feed from the power feed facility.

The vehicle may be configured to autonomously travel and autonomously travel to the destination along the travel route created by the processing apparatus.

According to such a configuration, when the vehicle is autonomous and falls under the welfare vehicle, possibility that the driver gets off the vehicle for power feed can be suppressed and the vehicle can autonomously travel to the destination along the created travel route.

The control system may further include a wireless power feed facility that wirelessly feeds power to the vehicle. When the vehicle falls under the welfare vehicle, the wireless power feed facility may feed power to the welfare vehicle such that an amount of power feed is larger than the amount of power feed to a vehicle that does not fall under the welfare vehicle.

According to such a configuration, opportunities of power feed from the power feed facility to the welfare vehicle can be reduced. Therefore, opportunities of power feed works outside the vehicle by the driver of the welfare vehicle can further be reduced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
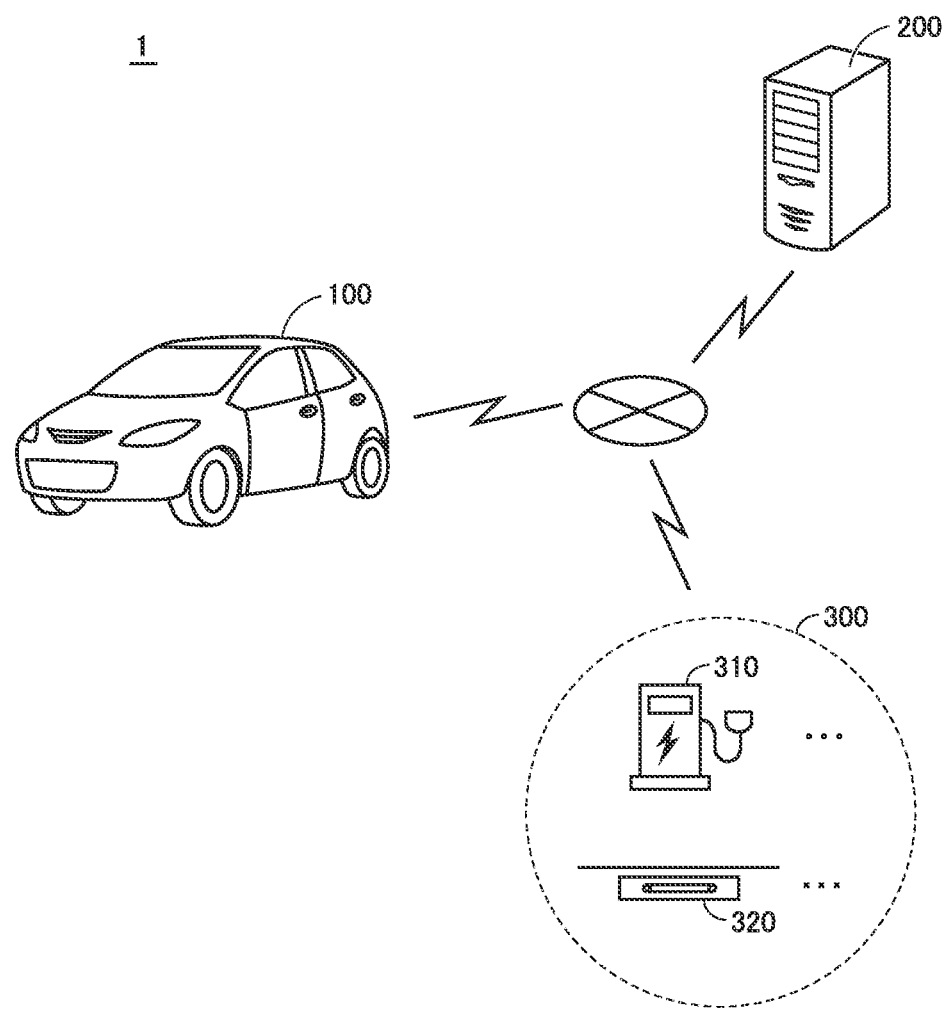
FIG. 1 is a diagram showing an overall configuration of a vehicle control system according to a first embodiment.

An embodiment of the present disclosure will be described in detail below with reference to the drawings. The same or corresponding elements in the drawings have the same reference characters allotted and description thereof will not be repeated.

First Embodiment

FIG. 1 is a diagram showing an overall configuration of a vehicle control system 1 according to a first embodiment of the present disclosure. Referring to FIG. 1, this control system 1 includes a vehicle 100, a server 200, and a power feed facility group 300. Vehicle 100 and power feed facility group 300 are configured to communicate with server 200 over a network such as the Internet.

Vehicle 100 is an electrically powered vehicle incorporating a power storage (not shown) for traveling chargeable by power feed facility group 300, and it is, for example, a battery electric vehicle (BEV), a plug-in hybrid electric vehicle (PHEV), and the like.

Information (a model, a charging method, a current location/a destination, or the like) on vehicle 100, map information (latest road information or the like), and information (a power feed method, a location of placement, or the like) on power feed facility group 300 are held in server 200. Then, server 200 creates a travel route to a destination suitable for vehicle 100 based on such various types of information.

In this first embodiment, information on vehicle 100 includes information on whether or not vehicle 100 falls under a welfare vehicle. In the present disclosure, the welfare vehicle refers to a vehicle provided with an assistance apparatus for a driver with a lower limb impairment, and a vehicle simply provided with an assistance apparatus for getting in and out of a passenger's seat or a rear seat does not fall under the welfare vehicle in the present disclosure. The assistance apparatus may be an apparatus that supports getting in and out of the driver's seat or an apparatus that supports a driving operation. When vehicle 100 falls under the welfare vehicle, server 200 creates such a travel route as reducing opportunities of power feed works outside the vehicle by the driver. A detailed configuration of vehicle 100 and server 200 will be described later.

Power feed facility group 300 includes a plurality of contact type power feed facilities 310 and a plurality of wireless power feed facilities 320 provided at many places. Contact type power feed facility 310 is a power feed facility that feeds power to a vehicle through a power feed cable by connection of a connector provided at a tip end of the power feed cable to an inlet of the vehicle. Wireless power feed facility 320 is a power feed facility that wirelessly feeds power to a vehicle through electromagnetic field with the use of a power transmission coil and a power reception coil mounted on the vehicle.

In this first embodiment, vehicle 100 is configured to receive electric power from both of wireless power feed facility 320 and contact type power feed facility 310.

Figure 2:
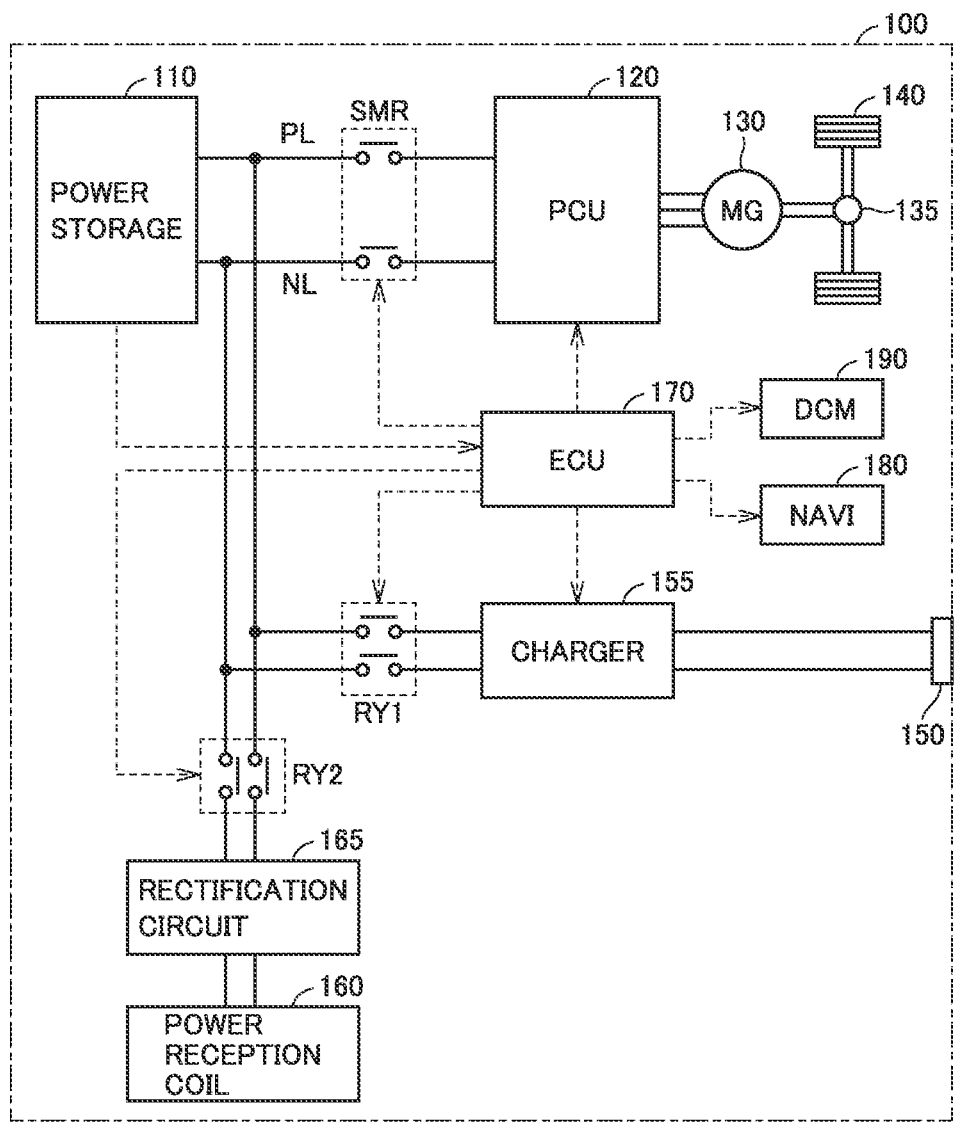
FIG. 2 is a diagram showing an exemplary configuration of a vehicle shown in FIG. 1.

FIG. 2 is a diagram showing an exemplary configuration of vehicle 100 shown in FIG. 1. Referring to FIG. 2, vehicle 100 includes a power storage 110, a system main relay SMR, a power control unit (PCU) 120, a motor generator 130, a power transmission gear 135, and a drive wheel 140. Vehicle 100 further includes an inlet 150, a charger 155, a power reception coil 160, a rectification circuit 165, and charge relays RY1 and RY2. Furthermore, vehicle 100 includes an electronic control unit (ECU) 170, a navigation apparatus 180, and a communication module 190.

Power storage 110 is a power storage element configured to be chargeable and dischargeable. Power storage 110 includes, for example, a secondary battery such as a lithium ion battery or a nickel metal hydride battery, or a power storage element such as an electric double layer capacitor. Electric power for generation of travel driving force by motor generator 130 is stored in power storage 110, and when system main relay SMR is closed, power storage 110 supplies stored electric power to PCU 120. Power storage 110 outputs detection values of a voltage, a current, and a temperature thereof detected by not-shown sensors to ECU 170.

System main relay SMR is provided in a pair of power lines PL and NL between power storage 110 and PCU 120. System main relay SMR switches between a closed state and an open state in accordance with a control signal from ECU 170.

PCU 120 is a drive apparatus that drives motor generator 130 and includes a power conversion device such as a converter and an inverter (neither of which is shown). PCU 120 is controlled by ECU 170 and converts direct-current (DC) power received from power storage 110 to alternating-current (AC) power for driving motor generator 130. PCU 120 rectifies electric power generated by motor generator 130 during braking of vehicle 100 to a voltage level of power storage 110 and outputs resultant electric power to power storage 110.

Motor generator 130 is an AC rotating electric machine, and it is, for example, a permanent magnet synchronous motor including a rotor having a permanent magnet embedded. Motor generator 130 generates travel driving force by being driven by PCU 120 and generated driving force is transmitted through power transmission gear 135 to drive wheel 140. During braking of vehicle 100, motor generator 130 can generate electric power by rotational force of drive wheel 140. Generated electric power is converted to charging power for power storage 110 by PCU 120 and stored in power storage 110.

Inlet 150 is configured such that a connector provided in the power feed cable of contact type power feed facility 310 (FIG. 1) can be connected thereto and receives electric power supplied from contact type power feed facility 310. Charger 155 is controlled by ECU 170 and converts electric power provided from inlet 150 into electric power with which power storage 110 can be charged in external charging (contact charging) in which contact type power feed facility 310 connected to inlet 150 charges power storage 110. In this example, contact type power feed facility 310 supplies AC power and charger 155 is implemented by an AC/DC converter. When contact type power feed facility 310 supplies DC power (DC contact charging), vehicle 100 does not have to include charger 155.

Charge relay RY1 is provided in an electrical path between charger 155 and power storage 110 and controlled to the closed state by ECU 170 in contact charging by contact type power feed facility 310.

Power reception coil 160 is configured to wirelessly receive electric power through electromagnetic field from the power transmission coil of wireless power feed facility 320 (FIG. 1) and receives electric power supplied from wireless power feed facility 320 during external charging (wireless charging) in which wireless power feed facility 320 charges power storage 110. Rectification circuit 165 rectifies AC power received by power reception coil 160 and outputs resultant AC power to power storage 110.

Charge relay RY2 is provided in an electrical path between rectification circuit 165 and power storage 110 and controlled to the closed state by ECU 170 during wireless charging by wireless power feed facility 320.

ECU 170 receives input of signals from various sensors and outputs a control signal to each device, and controls vehicle 100 and each device. ECU 170 carries out various types of control (drive control, braking control, steering control, or the like) relating to travel of vehicle 100. In external charging by contact type power feed facility 310 (FIG. 1), ECU 170 turns on charge relay RY1 and carries out contact charging for charging power storage 110 with the use of inlet 150 and charger 155. In external charging by wireless power feed facility 320 (FIG. 1), ECU 170 turns on charge relay RY2 and carries out wireless charging for charging power storage 110 with the use of power reception coil 160 and rectification circuit 165.

Navigation apparatus 180 shows on a display, a travel route from the current location of vehicle 100 to a set destination. Navigation apparatus 180 shows a position of the current location of vehicle 100, a position of the set destination, and the travel route from the current location to the destination. As will be described later, in this first embodiment, position information of the current location of vehicle 100 and position information of the set destination are transmitted as vehicle information to server 200, and server 200 determines the travel route to the destination in consideration of the vehicle information and the information on power feed facility group 300.

Communication module 190 is a vehicle-mounted data communication module (DCM) and configured to bidirectionally communicate data with server 200 over a communication network. Communication module 190 is configured to communicate also with a communication apparatus of power feed facility group 300 (in particular, power feed facilities (which will be described later) for wireless power feed while traveling including a plurality of wireless power feed facilities 320).

Figure 3:
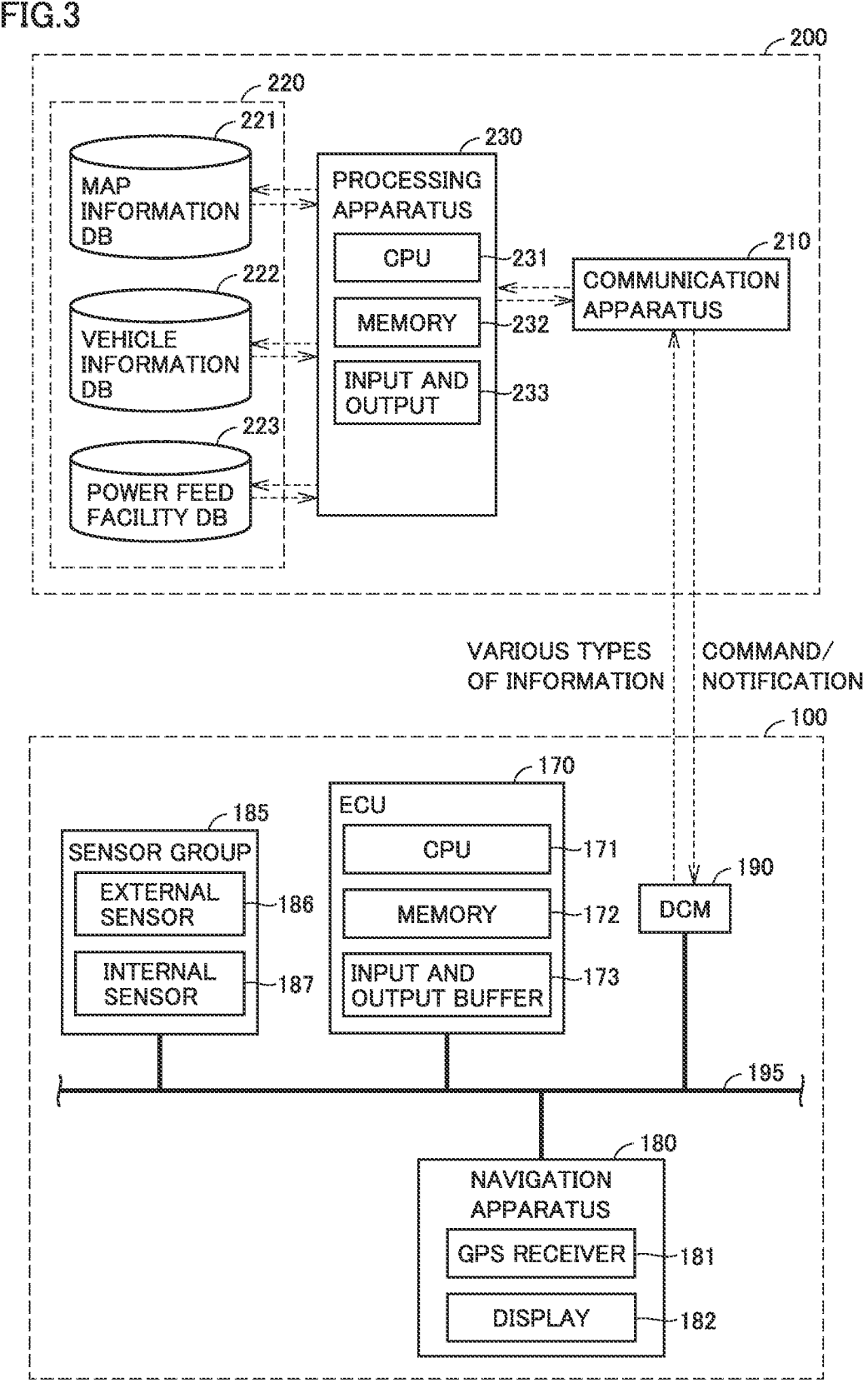
FIG. 3 is a diagram showing in further detail a configuration of the vehicle and a server.

FIG. 3 is a diagram showing in further detail a configuration of vehicle 100 and server 200. For vehicle 100, only ECU 170, navigation apparatus 180, communication module 190, and a sensor group 185 (which will be described later) will be described.

Referring to FIG. 3, vehicle 100 further includes sensor group 185. ECU 170, navigation apparatus 180, communication module 190, and sensor group 185 are configured to communicate with one another over a vehicle-mounted network 195 such as controller area network (CAN).

ECU 170 includes a processor 171 such as a central processing unit (CPU), a memory 172, and an input and output buffer 173. Memory 172 includes a read only memory (ROM) and a random access memory (RAM) that are not shown. Processor 171 executes a program stored in the ROM by developing the program on the RAM. Various types of processing performed by ECU 170 are described in the program stored in the ROM.

ECU 170 controls devices such that vehicle 100 is in a desired state in accordance with a signal from each sensor in sensor group 185. For example, ECU 170 carries out various types of control for achieving travel of vehicle 100 by controlling PCU 120 (FIG. 2). ECU 170 receives detection values of a voltage and a current of power storage 110 and calculates a state of charge (SOC) of power storage 110 based on these detection values.

When the connector of contact type power feed facility 310 is connected to inlet 150, ECU 170 sets charge relay RY1 to the closed state and controls charger 155, to thereby carry out contact charging for charging of power storage 110 with contact type power feed facility 310. When power reception coil 160 can receive electric power from wireless power feed facility 320, ECU 170 sets charge relay RY2 to the closed state and controls power reception from wireless power feed facility 320 by power reception coil 160, to thereby carry out wireless charging for charging of power storage 110 by wireless power feed facility 320.

ECU 170 controls PCU 120 and a steering apparatus (not shown) to carry out various types of control for achieving autonomous driving of vehicle 100. Autonomous driving means driving in which a driving operation such as acceleration, deceleration, steering, and the like of vehicle 100 is performed without a driving operation by a driver. In the autonomous driving by ECU 170, ECU 170 does not require a driving operation by the driver in any situation.

Therefore, vehicle 100 includes sensor group 185 that detects an external condition and an internal condition of vehicle 100. Sensor group 185 includes an external sensor 186 and an internal sensor 187. External sensor 186 is a sensor configured to detect a condition outside vehicle 100. Internal sensor 187 is a sensor configured to detect information in accordance with a traveling state of vehicle 100 as well as a steering operation, an accelerator operation, and a brake operation.

External sensor 186 includes, for example, a camera, a radar, a laser imaging detection and ranging (LIDAR), and the like (none of which is shown). The camera picks up an image of a condition of the outside of vehicle 100 and outputs image pick-up information on the condition of the outside of vehicle 100 to ECU 170. The radar detects an obstacle by transmitting radio waves (for example, millimeter waves) around vehicle 100 and receiving radio waves reflected by the obstacle. The radar outputs a distance to the obstacle and a direction of the obstacle as obstacle information on the obstacle to ECU 170. The LIDAR measures a distance to a reflection point and detects an obstacle by transmitting light (typically, ultraviolet rays, visible rays, or near infrared rays) around vehicle 100 and receiving light reflected by the obstacle. The LIDAR outputs, for example, the distance to the obstacle and the direction of the obstacle as obstacle information to ECU 170.

Internal sensor 187 includes, for example, a vehicle speed sensor, an acceleration sensor, a yaw rate sensor, and the like (none of which is shown). The vehicle speed sensor is provided in a wheel of vehicle 100 or a driveshaft that rotates integrally with the wheel, and detects a rotation speed of the wheel and outputs vehicle speed information including the speed of vehicle 100 to ECU 170. The acceleration sensor includes, for example, a forward and rearward acceleration sensor that detects an acceleration in the forward and rearward direction of vehicle 100 and a lateral acceleration sensor that detects a lateral acceleration of vehicle 100, and outputs acceleration information including both of the accelerations to ECU 170. The yaw rate sensor detects a yaw rate (an angular velocity of rotation) around a vertical axis of the center of gravity of vehicle 100. The yaw rate sensor is implemented, for example, by a gyro sensor, and outputs yaw rate information including the yaw rate of vehicle 100 to ECU 170.

Navigation apparatus 180 includes a GPS receiver 181 and a display 182. GPS receiver 181 specifies a position of vehicle 100 based on radio waves from an artificial satellite (not shown). Display 182 performs a touch panel function. Various types of information are shown on display 182 and display 182 accepts various operations by a user. For example, a current location of vehicle 100 is shown on display 182 as being superimposed on a road map around vehicle 100. In addition, display 182 accepts an operation to set a destination or various operations such as an operation for selection from among presented (shown) travel routes.

In this first embodiment, when a destination is set by an operation onto display 182, navigation apparatus 180 outputs information on the set destination to ECU 170, together with information on the current location of vehicle 100 obtained by GPS receiver 181. ECU 170 transmits a request for creation of the travel route from the current location to the destination, together with position information indicating the current location and the destination of vehicle 100 to server 200 by means of communication module 190. At that time, ECU 170 transmits to server 200, also information indicating whether or not vehicle 100 falls under the welfare vehicle and information on the charging method (contact/wireless) to which vehicle 100 is adapted.

Server 200 includes a communication apparatus 210, a storage device 220, and a processing apparatus 230. Communication apparatus 210 is configured to bidirectionally communicate data with communication module 190 of vehicle 100 over a communication network.

Storage device 220 includes a map information database (DB) 221, a vehicle information database (DB) 222, and a power feed facility database (DB) 223. Data on a latest road map is stored in map information DB 221. Various types of information on vehicle 100 are stored in vehicle information DB 222. Specifically, vehicle information (position information (current location/destination) of the vehicle, a model (whether or not a vehicle falls under the welfare vehicle), the charging method to which the vehicle is adapted (contact/wireless), and the like) obtained from vehicle 100 is stored in vehicle information DB 222, in correspondence with an ID provided to vehicle 100. A plurality of vehicles can use this control system 1 and information on a plurality of vehicles 100 is stored in vehicle information DB 222.

Information on power feed facilities in power feed facility group 300 (FIG. 1) is stored in power feed facility DB 223. For example, position information of each power feed facility, information on a power feed method (contact/wireless), and the like are stored in power feed facility DB 223 in correspondence with an ID provided for each power feed facility.

Map information DB 221 and power feed facility DB 223 are regularly updated to latest information. When vehicle information is obtained from vehicle 100 by setting of the destination in vehicle 100, vehicle information DB 222 is updated based on the obtained vehicle information.

Processing apparatus 230 includes a processor 231 such as a CPU, a memory 232, and an input and output buffer 233. Memory 232 includes a ROM and a RAM that are not shown. CPU 231 executes a program stored in the ROM by developing the program on the RAM. Various types of processing performed by processing apparatus 230 are described in the program stored in the ROM.

When processing apparatus 230 receives a request for creation of the travel route from vehicle 100, it creates the travel route from the current location to the destination of vehicle 100 based on various types of information in map information DB 221, vehicle information DB 222, and power feed facility DB 223.

In a case where vehicle 100 falls under the welfare vehicle, for contact charging by contact type power feed facility 310, works outside the vehicle for connecting the power feed cable to inlet 150 are required, which leads to much time and troubles for the driver of the welfare vehicle.

Then, in the present first embodiment, when vehicle 100 falls under the welfare vehicle, processing apparatus 230 creates the travel route of vehicle 100 to include a large number of wireless power feed facilities 320 along the travel route. Since wireless charging by wireless power feed facility 320 does not require works outside the vehicle for connecting the power feed cable to inlet 150, the driver does not necessarily have to get off the vehicle in power feed. Therefore, opportunities of power feed works outside the vehicle by the driver of vehicle 100 can be reduced.

"Along the travel route" means not only power feed from a wireless power feed facility provided in a facility or the like proximate to the travel route but also power feed from a wireless power feed facility for wireless power feed while traveling (which will be described later) provided in a travel lane on the travel route.

When vehicle 100 does not fall under the welfare vehicle, on the other hand, processing apparatus 230 creates the travel route shortest in travel distance to the destination. As the travel route is created to include a large number of wireless power feed facilities 320 along the travel route, the travel distance to the destination may become long. When vehicle 100 does not fall under the welfare vehicle, an unduly long travel distance to the destination can be avoided. Processing apparatus 230 may create the travel route shortest in required time period until the destination, instead of the travel route shortest in travel distance.

Then, processing apparatus 230 transmits to vehicle 100, route information for showing the created travel route in vehicle 100. When vehicle 100 receives the route information from server 200, it shows the created travel route on display 182 of navigation apparatus 180. Though not particularly shown, the route information may be transmitted from processing apparatus 230 to a portable terminal (a smartphone or the like) of a driver so that the created travel route is shown on the portable terminal of the driver.

In this first embodiment, wireless power feed facility 320 covers "wireless power feed while traveling" and "wireless power feed while parking." Wireless power feed while traveling is power feed from wireless power feed facility 320 placed in the travel lane to vehicle 100, and a plurality of wireless power feed facilities 320 are arranged in line in the travel lane. The travel lane where the plurality of wireless power feed facilities 320 are placed is also referred to as a "power feed lane" below. "While traveling" means a state that vehicle 100 is on the road for traveling, and it encompasses not only a state in which vehicle 100 is actually traveling but also a state that the vehicle remains stopped on the road such as the vehicle waiting at traffic lights. Wireless power feed while parking, on the other hand, refers to power feed to vehicle 100 during parking from wireless power feed facility 320 placed at a power feed station or the like.

Figure 4:
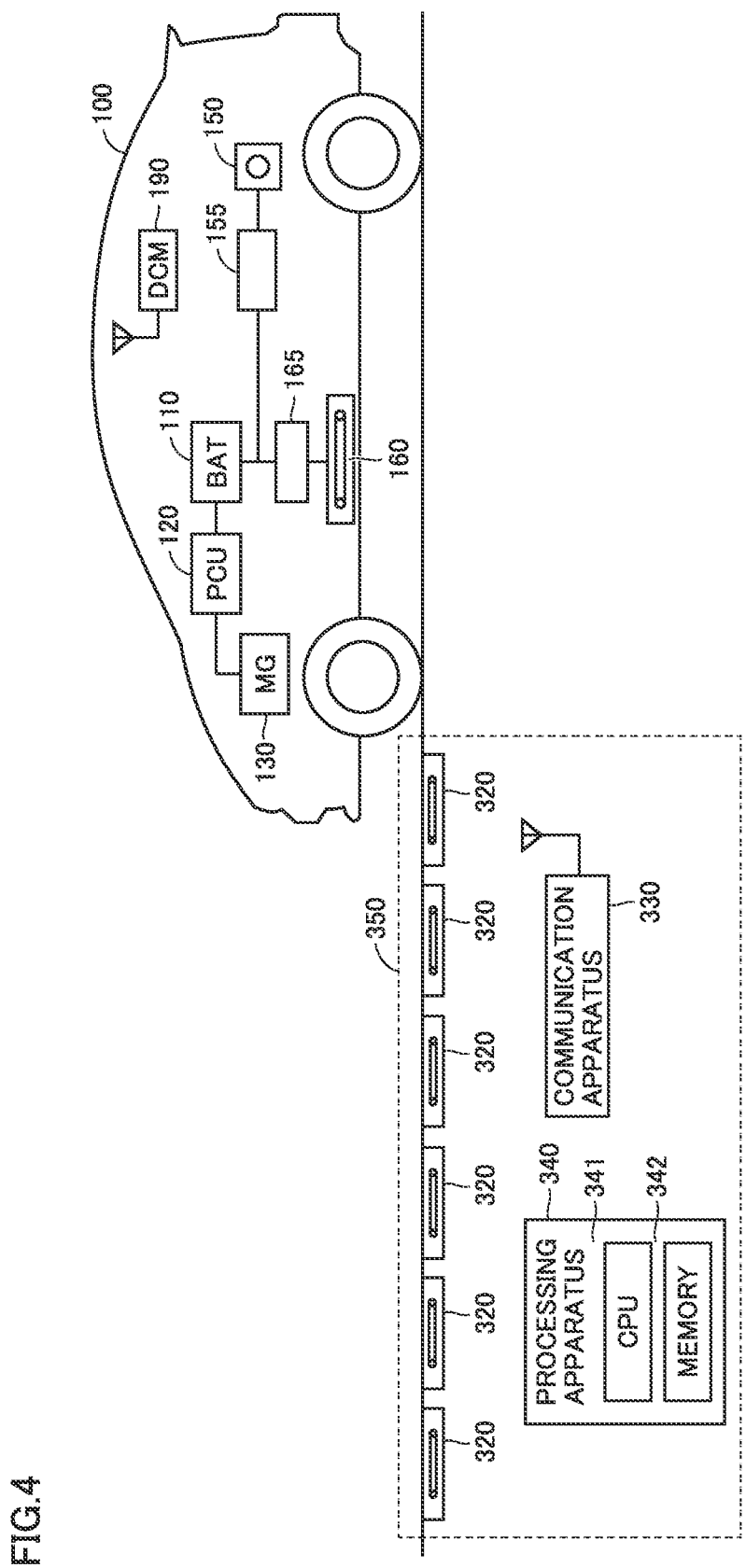
FIG. 4 is a diagram illustrating exemplary wireless power feed while traveling.

FIG. 4 is a diagram illustrating exemplary wireless power feed while traveling. Referring to FIG. 4, a power feed facility 350 used for wireless power feed while traveling includes a plurality of wireless power feed facilities 320 placed in the power feed lane, a communication apparatus 330, and a processing apparatus 340. Though FIG. 4 shows six wireless power feed facilities 320, the number of wireless power feed facilities 320 is not limited thereto.

Each wireless power feed facility 320 includes a power transmission coil and receives supply of electric power from an AC power supply (neither of which is shown). Wireless power feed facility 320 can wirelessly transmit electric power to power reception coil 160 of vehicle 100 coupled to the power transmission coil through electromagnetic field by forming electromagnetic field around the power transmission coil.

Communication apparatus 330 is configured to be capable of wide-area communication with communication apparatus 210 of server 200 over a communication network. Communication apparatus 330 is configured to communicate also with communication module 190 of vehicle 100 through short-range wireless communication.

Processing apparatus 340 includes a processor 341 such as a CPU and a memory 342. Memory 342 includes a ROM and a RAM that are not shown. CPU 341 executes a program stored in the ROM by developing the program on the RAM. Various types of processing performed by processing apparatus 340 are described in the program stored in the ROM.

When wireless charging while traveling is carried out, vehicle 100 transmits information on vehicle 100 together with a vehicle ID for identifying vehicle 100 to server 200 through communication module 190. The information includes, for example, requested power (or a requested amount of electric power) indicating a requested value of power received (or an amount of electric power) from power feed facility 350, information on a current position of vehicle 100, and information (a size, a height from the ground, and the like) of power reception coil 160.

When server 200 receives the vehicle ID and the information on vehicle 100 from vehicle 100, it has such information stored in vehicle information DB 222 and transmits the information to power feed facility 350 through communication apparatus 210.

When power feed facility 350 receives the vehicle ID and the information on vehicle 100 from server 200, it registers the received vehicle ID of vehicle 100 in an identification information list in which vehicle IDs of vehicles that may be fed with power from power feed facility 350 are registered.

After vehicle 100 transmits the vehicle ID and the information on vehicle 100 to server 200, it emits the vehicle ID thereof through short-range wireless communication from communication module 190. Then, when power feed facility 350 senses approach of vehicle 100 thereto by receiving the vehicle ID emitted from vehicle 100 at communication apparatus 330 and checking the vehicle ID against the vehicle IDs registered in the identification information list, it is set to an active state in which electric power is supplied to wireless power feed facility 320. When power reception coil 160 of vehicle 100 arrives at a position above wireless power feed facility 320 in this state, electric power is wirelessly transmitted from wireless power feed facility 320 through electromagnetic field to power reception coil 160 of vehicle 100.

Then, when power feed facility 350 can no longer receive at communication apparatus 330, the vehicle ID emitted from vehicle 100 through short-range wireless communication, supply of electric power to wireless power feed facility 320 is stopped and power feed from power feed facility 350 to vehicle 100 ends.

Figure 5:
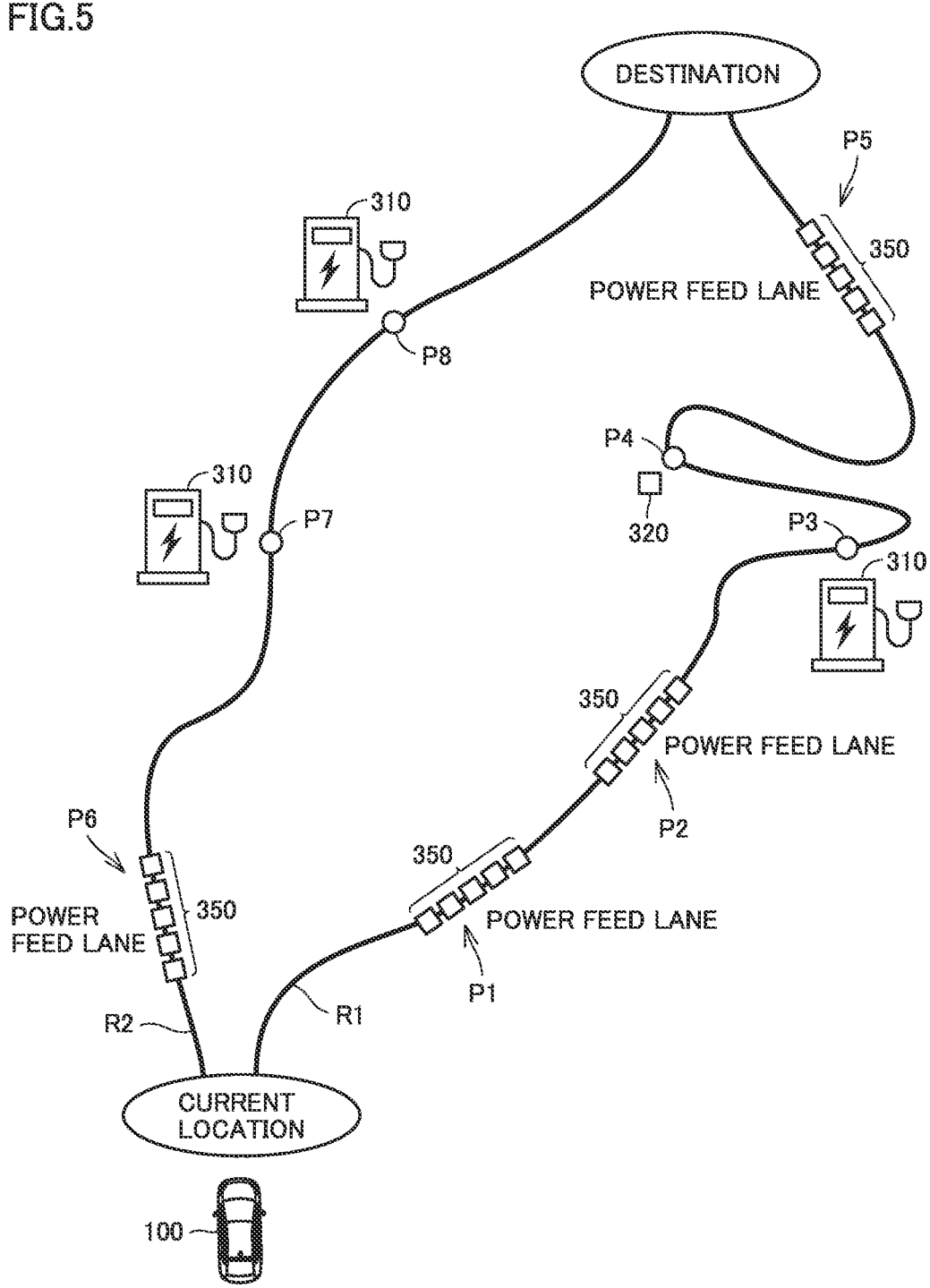
FIG. 5 is a diagram exemplifying a travel route from a current location of the vehicle to a set destination.

FIG. 5 is a diagram exemplifying a travel route from a current location of vehicle 100 to a set destination. This example shows two travel routes R1 and R2 the same in current location and destination.

Referring to FIG. 5, travel route R1 includes five power feed points P1 to P5. Power feed points P1, P2, and P5 are each provided with the power feed lane including power feed facility 350, and at these power feed points, vehicle 100 can carry out wireless charging while traveling with the use of power feed facility 350.

Power feed points P3 and P4 are facilities (for example, a shopping mall or a convenience store) along travel route R1. Power feed point P3 is provided with contact type power feed facility 310. At power feed point P3, vehicle 100 can carry out contact charging with the use of contact type power feed facility 310. Power feed point P4 is provided with wireless power feed facility 320. At power feed point P4, vehicle 100 can carry out wireless charging while parking with the use of wireless power feed facility 320.

Travel route R2 includes three power feed points P6 to P8. Power feed point P6 is provided with the power feed lane including power feed facility 350, and at power feed point P6, vehicle 100 can carry out wireless charging while traveling with the use of power feed facility 350.

Power feed points P7 and P8 are facilities (a shopping mall or a convenience store) along travel route R2. Power feed points P7 and P8 are each provided with contact type power feed facility 310. At power feed points P7 and P8, vehicle 100 can carry out contact charging with the use of contact type power feed facility 310.

Travel route R2 is a route shortest in travel distance (or required time period) from the current location to the destination. On the other hand, travel route R1 is a route including a larger number of wireless power feed facilities along the route than travel route R2. As illustrated, wireless charging can be carried out only at power feed point P6 along travel route R2, whereas wireless charging can be carried out at power feed points P1, P2, P4, and P5 along travel route R1. In other words, travel route R1 is higher in ratio of the wireless power feed facilities than travel route R2.

In the present first embodiment, when vehicle 100 falls under the welfare vehicle, travel route R1 higher in ratio of wireless power feed facility than travel route R2 is selected, rather than travel route R2 shortest in travel distance (or required time period) to the destination. In other words, when vehicle 100 falls under the welfare vehicle, travel route R1 higher in ratio of wireless power feed facility than travel route R2 is created as the travel route of vehicle 100. Opportunities of power feed works (works involved with contact power feed) outside the vehicle by the driver of the welfare vehicle can thus be reduced.

When vehicle 100 does not fall under the welfare vehicle, on the other hand, travel route R2 shortest in travel distance (or required time period) to the destination is selected. In other words, when vehicle 100 does not fall under the welfare vehicle, travel route R2 shortest in travel distance (or required time period) to the destination is created as the travel route of vehicle 100. When vehicle 100 does not fall under the welfare vehicle, an unduly long travel distance (or required time period) to the destination can thus be avoided.

Figure 6:
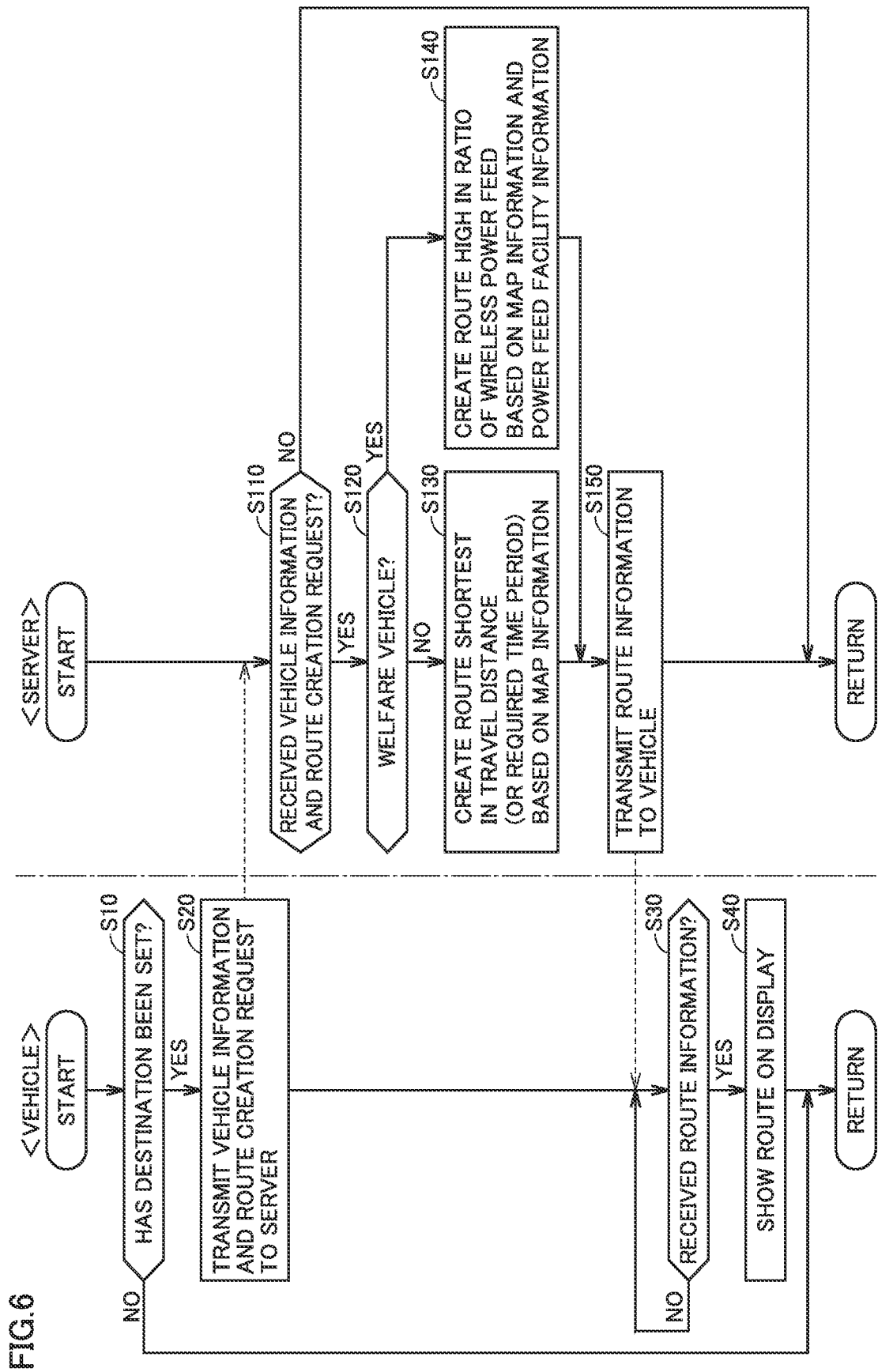
FIG. 6 is a flowchart showing an exemplary procedure in processing performed in the vehicle and the server in creation of a travel route of the vehicle.

FIG. 6 is a flowchart showing an exemplary procedure in processing performed in vehicle 100 and server 200 in creation of the travel route of vehicle 100. A series of processing shown in this flowchart is repeatedly performed every prescribed cycle or each time a prescribed condition is satisfied in vehicle 100 and server 200.

Referring to FIG. 6, in vehicle 100, ECU 170 determines whether or not the destination has been set in navigation apparatus 180 (step S10). When the destination has not been set (NO in step S10), ECU 170 has the process make transition to return without performing a series of subsequent processing.

When the destination has been set (YES in step S10), ECU 170 transmits information on vehicle 100 (vehicle information) and a request for creation of the travel route to server 200 through communication module 190 (step S20). The vehicle information transmitted to server 200 includes information indicating the current location and the destination of vehicle 100, information indicating whether or not vehicle 100 falls under the welfare vehicle, and information on the charging method (contact/wireless) to which vehicle 100 is adapted. The vehicle information and the request for creation of the travel route are transmitted to server 200 when a destination is set in navigation apparatus 180, and not repeatedly transmitted with the destination having been set.

Then, ECU 170 determines whether or not it has received route information including the travel route created in server 200 in accordance with the request for creation of the travel route from server 200 (step S30). Then, when ECU 170 receives the route information from server 200 (YES in step S30), it shows the travel route included in the received route information on display 182 of navigation apparatus 180 (step S40). The driver of vehicle 100 can thus visually recognize the travel route shown on display 182 and determine the actual travel route and a position of charging by the wireless power feed facility.

In server 200, processing apparatus 230 determines whether or not it has received the information on vehicle 100 (vehicle information) and the request for creation of the travel route from vehicle 100 (step S110). When processing apparatus 230 has not received the vehicle information and the request for creation of the travel route (NO in step S110), the process makes transition to return without performing a series of subsequent processing.

When server 200 receives the vehicle information and the request for creation of the travel route, processing apparatus 230 creates the travel route from the current location to the destination of vehicle 100 included in the received vehicle information.

Specifically, processing apparatus 230 determines whether or not vehicle 100 falls under the welfare vehicle based on the received vehicle information (step S120). When processing apparatus 230 determines that vehicle 100 does not fall under the welfare vehicle (NO in step S120), processing apparatus 230 creates a route shortest in travel distance (or required time period) from the current location to the destination of vehicle 100 based on map information in map information DB 221 (step S130).

When processing apparatus 230 determines in step S120 that vehicle 100 falls under the welfare vehicle (YES in step S120), processing apparatus 230 creates a route higher in ratio of wireless power feed than the travel route created in step S130, based on the map information in map information DB 221 and power feed facility information in power feed facility DB 223 (step S140). In other words, when vehicle 100 falls under the welfare vehicle, processing apparatus 230 creates the travel route from the current location to the destination of vehicle 100 such that a larger number of wireless power feed facilities (including the power feed lane) are included along the travel route than when vehicle 100 does not fall under the welfare vehicle.

Referring again to FIG. 5, for example, when vehicle 100 does not fall under the welfare vehicle, travel route R2 shortest in travel distance (or required time period) from the current location to the destination is created. When vehicle 100 falls under the welfare vehicle, travel route R1 including a larger number of wireless power feed facilities along the route than travel route R2 is created.

Referring again to FIG. 6, when the travel route is created in step S130 or S140, processing apparatus 230 transmits the route information including the created travel route to vehicle 100 through communication apparatus 210 (step S150).

Though vehicle 100 is assumed as an autonomous vehicle in the above example, it is not essential that vehicle 100 is configured as being autonomous in this first embodiment and a vehicle without an autonomous driving function may be applicable. As set forth above, in this first embodiment, when vehicle 100 falls under the welfare vehicle, the travel route is created to include a large number of wireless power feed facilities 320 (including power feed facility 350 placed in the power feed lane) along the travel route. Since wireless power feed facility 320 does not require works outside the vehicle for connecting the power feed cable to inlet 150 of vehicle 100, the driver does not necessarily have to get off the vehicle in power feed. Therefore, according to this first embodiment, opportunities of power feed works (works involved with contact charging) outside the vehicle by the driver of the welfare vehicle can be reduced.

According to this first embodiment, when vehicle 100 does not fall under the welfare vehicle, the travel route shortest in travel distance (or required time period) to the destination is created. Therefore, an unduly long travel distance (or required time period) to the destination can be avoided.

Modification

When vehicle 100 falls under an autonomous vehicle, vehicle 100 may autonomously travel to the destination in accordance with the created travel route. In other words, when vehicle 100 is autonomous and falls under the welfare vehicle, vehicle 100 may autonomously travel to the destination in accordance with the travel route created to include a larger number of wireless power feed facilities (including the power feed lane) along the travel route than when vehicle 100 does not fall under the welfare vehicle.

Figure 7:
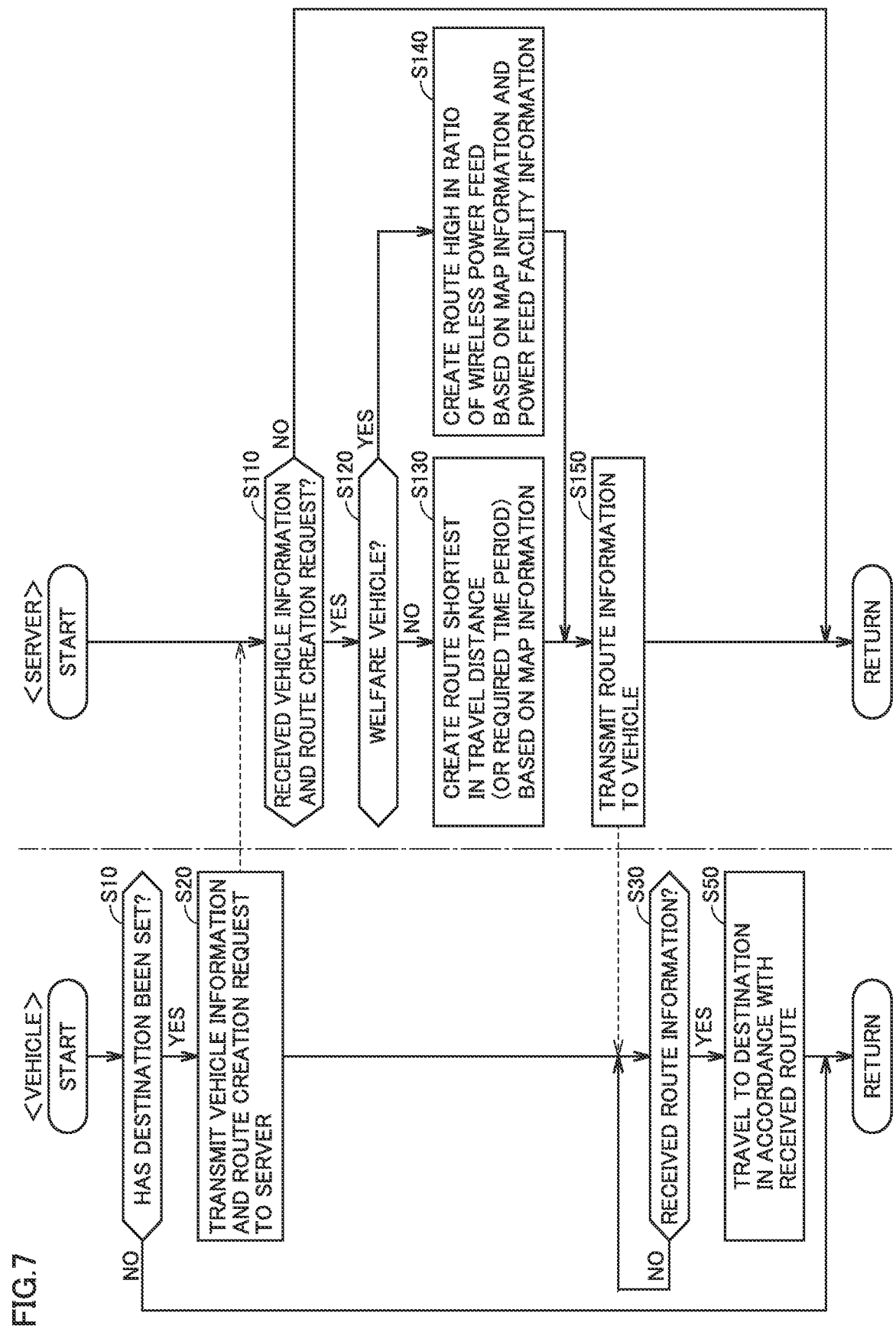
FIG. 7 is a flowchart showing an exemplary procedure in processing performed in the vehicle and the server in a modification.

FIG. 7 is a flowchart showing an exemplary procedure in processing performed in vehicle 100 and server 200 in this modification. This flowchart corresponds to the flowchart in FIG. 6 described in the first embodiment.

Referring to FIG. 7, this flowchart includes step S50 instead of step S40 in the flowchart in FIG. 6. Specifically, when ECU 170 in vehicle 100 receives the route information from server 200 in step S30 (YES in step S30), vehicle 100 autonomously travels to the destination in accordance with the travel route included in the received route information (step S50). Other processing in vehicle 100 and processing in server 200 are the same as in the first embodiment shown in FIG. 6.

Specifically, when vehicle 100 does not fall under the welfare vehicle, travel route R2 shortest in travel distance (or required time period) from the current location to the destination is created and vehicle 100 autonomously travels in accordance with travel route R2. When vehicle 100 falls under the welfare vehicle, on the other hand, travel route R1 including a larger number of wireless power feed facilities along the route than travel route R2 is created and vehicle 100 autonomously travels in accordance with travel route R1.

According to this modification, when vehicle 100 falls under the autonomous vehicle and falls under the welfare vehicle, possibility that the driver gets off the vehicle for power feed can be suppressed and the vehicle can autonomously travel to the destination in accordance with the created travel route.

Second Embodiment

In the first embodiment, when vehicle 100 falls under the welfare vehicle, the travel route including a large number of wireless power feed facilities is created and the created travel route is presented to the driver. In the modification of the first embodiment, when vehicle 100 falls under an autonomous vehicle, vehicle 100 autonomously travels in accordance with the created travel route.

In this second embodiment, when vehicle 100 falls under the welfare vehicle, a power feed plan of vehicle 100 is created such that an amount of power feed from the wireless power feed facility is larger than that when vehicle 100 does not fall under the welfare vehicle. Opportunities of power feed from the power feed facility to vehicle 100 can thus be reduced and opportunities of power feed works outside the vehicle by the driver can further be reduced.

For example, when power feed capability of a power feed facility is being restricted due to electric power supply and demand adjustment or the like, such a plan for power feed from the wireless power feed facility to vehicle 100 that power is fed to the welfare vehicle preferentially over a vehicle that does not fall under the welfare vehicle (which is referred to as a "common vehicle" below) in response to a power feed request from vehicle 100 is created in the wireless power feed facility. Specifically, such a plan for power feed from the wireless power feed facility to vehicle 100 that an amount of electric power larger than a requested amount of feed power is supplied to the welfare vehicle, that power is fed only to the welfare vehicle, or that an upper limit of the amount of power feed to the welfare vehicle is larger than an upper limit of the amount of power feed to the common vehicle, is created.

When vehicle 100 falls under the welfare vehicle, such a plan for power feed of vehicle 100 along the travel route from the current location to the destination that the amount of power feed from the wireless power feed facility is larger than that when vehicle 100 does not fall under the welfare vehicle may be created.

An overall configuration of the vehicle control system and the configurations of the vehicle, the server, and the power feed facility group (including power feed facility 350 for wireless power feed while traveling) included in the control system in this second embodiment are the same as the configurations in the first embodiment described with reference to FIGS. 1 to 4.

Figure 8:
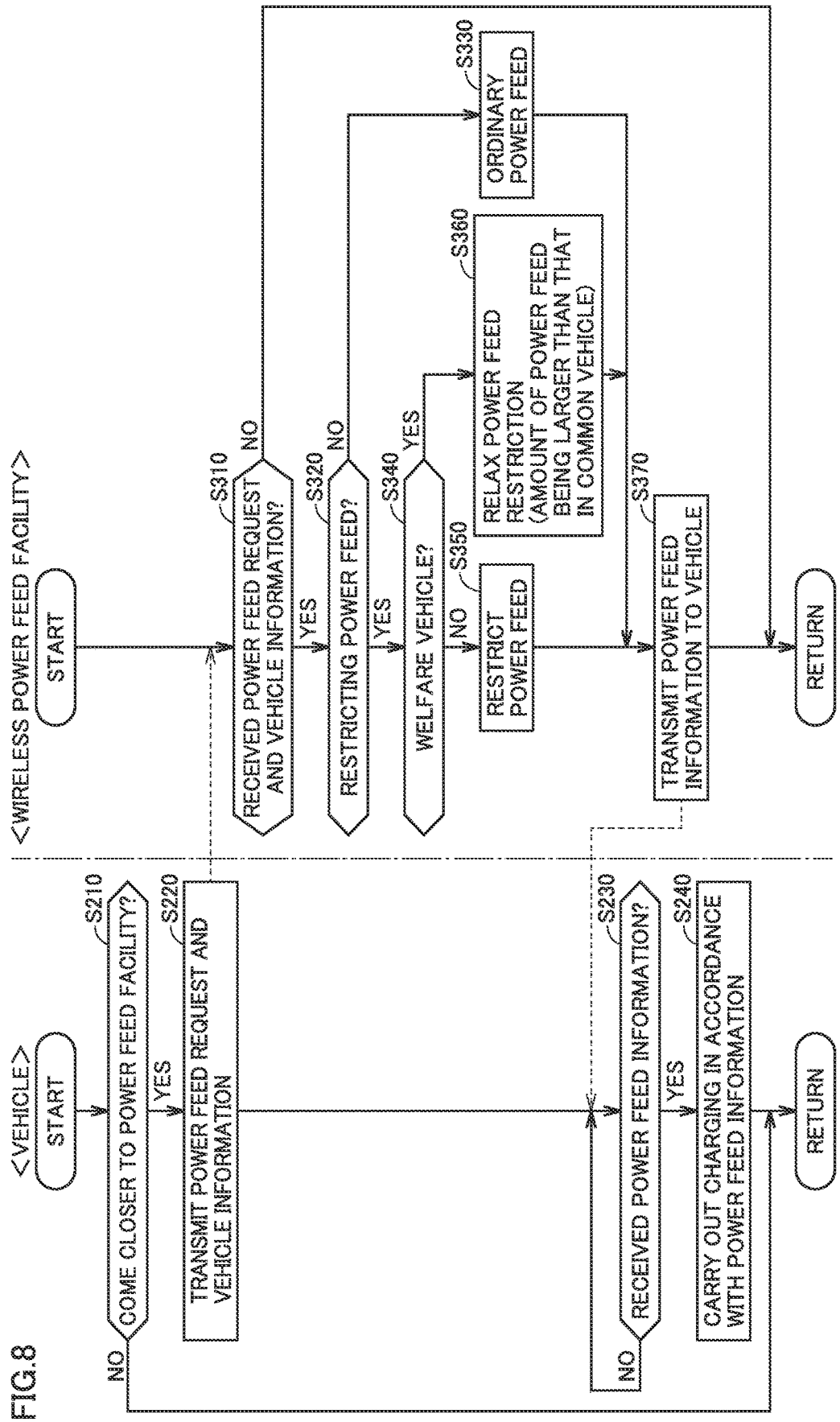
FIG. 8 is a flowchart showing an exemplary procedure in processing performed in the vehicle and a wireless power feed facility in a second embodiment.

FIG. 8 is a flowchart showing an exemplary procedure in processing performed in vehicle 100 and a wireless power feed facility in the second embodiment. The wireless power feed facility may be power feed facility 350 (FIG. 4) for wireless power feed while traveling or wireless power feed facility 320 provided in a facility along the travel route. Description will be given below with the wireless power feed facility being implemented by power feed facility 350. A series of processing shown in this flowchart is repeatedly performed every prescribed cycle or each time a prescribed condition is satisfied in vehicle 100 and power feed facility 350.

Referring to FIG. 8, ECU 170 in vehicle 100 determines whether or not vehicle 100 has come closer to power feed facility 350 (step S210). When vehicle 100 has not come closer to power feed facility 350 (NO in step S210), ECU 170 has the process make transition to return without performing a series of subsequent processing.

When ECU 170 determines in step S210 that vehicle 100 has come closer to power feed facility 350 (YES in step S210), ECU 170 transmits a request for power feed from power feed facility 350 and information on vehicle 100 (vehicle information) to power feed facility 350 (step S220). The vehicle information transmitted to power feed facility 350 includes at least information indicating whether or not vehicle 100 falls under the welfare vehicle, and may further include the requested amount of feed power. Vehicle 100 and power feed facility 350 communicate with each other also through communication module 190.

Then, ECU 170 determines whether or not it has received from power feed facility 350, information on power feed (power feed information) from power feed facility 350 to vehicle 100 (step S230). The power feed information will be described later in a flow for power feed facility 350. When ECU 170 receives the power feed information from power feed facility 350 (YES in step S230), ECU 170 carries out wireless charging from power feed facility 350 in accordance with the power feed information (step S240).

In wireless power feed facility 350, processing apparatus 340 (FIG. 4) determines whether or not it has received from vehicle 100, a power feed request directed to power feed facility 350 and the information on vehicle 100 (vehicle information) (step S310). When processing apparatus 340 has not received the power feed request and the vehicle information (NO in step S310), it has the process make transition to return without performing a series of subsequent processing.

When power feed facility 350 has received the power feed request and the vehicle information, processing apparatus 340 creates the power feed information on power feed to vehicle 100 in accordance with the received vehicle information. Specifically, processing apparatus 340 determines whether or not power feed from power feed facility 350 is being restricted due to electric power supply and demand adjustment or the like (step S320). Unless power feed is being restricted (NO in step S320), processing apparatus 340 sets power feed to vehicle 100 to ordinary power feed in accordance with the power feed request from vehicle 100 (step S330).

When processing apparatus 340 determines in step S320 that power feed is being restricted due to electric power supply and demand adjustment or the like (YES in step S320), processing apparatus 340 determines whether or not vehicle 100 falls under the welfare vehicle based on the vehicle information received in step S310 (step S340). When processing apparatus 340 determines that vehicle 100 does not fall under the welfare vehicle (NO in step S340), processing apparatus 340 restricts power feed to vehicle 100 in accordance with power feed restriction (step S350). For example, power feed is restricted by setting the amount of power feed to be smaller than the requested amount of feed power received from vehicle 100, setting the upper limit of the amount of power feed to vehicle 100 to be lower than in an ordinary state, or not feeding power to vehicle 100.

When processing apparatus 340 determines in step S340 that vehicle 100 falls under the welfare vehicle (YES in step S340), processing apparatus 340 relaxes power feed restriction in power feed facility 350 (step S360). For example, processing apparatus 340 relaxes power feed restriction by reducing an amount of decrease from the requested amount of feed power due to power feed restriction as compared with the amount of decrease for the common vehicle or by not restricting power feed. Alternatively, processing apparatus 340 may relax power feed restriction by setting the upper limit of the amount of power feed to vehicle 100 to be higher than that for the common vehicle or by allowing power feed to the welfare vehicle but not allowing power feed to the common vehicle. Thus, when vehicle 100 falls under the welfare vehicle, the amount of power feed from power feed facility 350 to vehicle 100 is larger than when vehicle 100 falls under the common vehicle.

Then, processing apparatus 340 transmits power feed information including information on power feed from power feed facility 350 to vehicle 100 in step S330, S340, or S350 to vehicle 100 through communication apparatus 330 (FIG. 4) (step S370).

As set forth above, in this second embodiment, when vehicle 100 falls under the welfare vehicle, the power feed plan for vehicle 100 is created such that the amount of power feed from the wireless power feed facility is larger than when vehicle 100 does not fall under the welfare vehicle. Thus, when vehicle 100 falls under the welfare vehicle, opportunities of power feed from the power feed facility to vehicle 100 can be reduced and opportunities of power feed works (works involved with contact charging) outside the vehicle by the driver of the welfare vehicle can further be reduced.

Though the power feed information including information on power feed from the wireless power feed facility to vehicle 100 is created in the power feed facility in the second embodiment above (FIG. 8), processing on the side of the power feed facility in FIG. 8 may be performed in server 200. In this case, server 200 obtains information as to whether or not power feed is being restricted in the power feed facility which vehicle 100 has requested to feed power, from the power feed facility or from a server that manages electric power supply and demand adjustment in a region to which the power feed facility belongs.

The function of server 200 may be performed by vehicle 100 in each embodiment and the modification above.

The second embodiment can be implemented as being combined as appropriate with the first embodiment or the modification thereof.

Though embodiments of the present invention have been described above, it should be understood that the embodiments disclosed herein are illustrative and non-restrictive in every respect. The technical scope shown in the present disclosure is defined by the terms of the claims and is intended to include any modifications within the scope and meaning equivalent to the terms of the claims.

What is claimed is:

1. A control device of a vehicle incorporating a power reception apparatus that wirelessly receives electric power from a power feed facility outside the vehicle, the control device comprising:
   a storage device in which information on the vehicle and information on the power feed facility are stored; and
   a processing apparatus that creates a travel route from a current location to a destination of the vehicle, wherein
   the information on the vehicle includes information on whether the vehicle falls under a welfare vehicle provided with an assistance apparatus for a driver with a lower limb impairment,
   the information on the power feed facility includes position information of the power feed facility and information indicating whether the power feed facility falls under a contact type power feed facility or a wireless power feed facility, and
   the processing apparatus creates the travel route such that a larger number of wireless power feed facilities are included along the travel route when the vehicle falls under the welfare vehicle than when the vehicle does not fall under the welfare vehicle.

2. The control device of the vehicle according to claim 1, wherein
   when the vehicle does not fall under the welfare vehicle, the processing apparatus creates the travel route shortest in travel distance or required time period to the destination.

3. The control device of the vehicle according to claim 1, wherein
   the processing apparatus outputs route information for showing the created travel route on a display.

4. The control device of the vehicle according to claim 1, wherein
the processing apparatus outputs route information for allowing the vehicle configured to autonomously travel to autonomously travel along the created travel route to the destination.

5. The control device of the vehicle according to claim 1, wherein
when the vehicle falls under the welfare vehicle, the processing apparatus creates a plan for power feed to the welfare vehicle along the travel route such that an amount of power feed from the wireless power feed facility is larger than the amount of power feed to a vehicle that does not fall under the welfare vehicle.

6. A vehicle control system comprising:
a vehicle incorporating a power reception apparatus that wirelessly receives electric power from a power feed facility outside the vehicle;
a storage device in which information on the vehicle and information on the power feed facility are stored; and
a processing apparatus that creates a travel route from a current location to a destination of the vehicle, wherein
the information on the vehicle includes information on whether the vehicle falls under a welfare vehicle provided with an assistance apparatus for a driver with a lower limb impairment,
the information on the power feed facility includes position information of the power feed facility and information indicating whether the power feed facility falls under a contact type power feed facility or a wireless power feed facility, and
the processing apparatus creates the travel route such that a larger number of wireless power feed facilities are included along the travel route when the vehicle falls under the welfare vehicle than when the vehicle does not fall under the welfare vehicle.

7. The vehicle control system according to claim 6, wherein
the vehicle includes a display on which the travel route created by the processing apparatus is shown.

8. The vehicle control system according to claim 6, wherein
the vehicle is configured to autonomously travel, and autonomously travels to the destination along the travel route created by the processing apparatus.

9. The vehicle control system according to claim 6, further comprising a wireless power feed facility that wirelessly feeds power to the vehicle, wherein
when the vehicle falls under the welfare vehicle, the wireless power feed facility feeds power to the welfare vehicle such that an amount of power feed is larger than the amount of power feed to a vehicle that does not fall under the welfare vehicle.

* * * * *